United States Patent [19]

Pierce

[11] 4,418,585

[45] Dec. 6, 1983

[54] FOUR SPEED RATIO TRANSVERSE AUTOMATIC TRANSMISSION

[75] Inventor: Stanley L. Pierce, Walled Lake, Mich.

[73] Assignee: Ford Motor Company, Dearborn, Mich.

[21] Appl. No.: 141,855

[22] Filed: Apr. 21, 1980

[51] Int. Cl.³ .............................................. F16H 37/08
[52] U.S. Cl. ........................................ 74/695; 74/701; 74/730; 74/758; 74/759
[58] Field of Search .................. 74/688, 695, 665 GE, 74/682, 762, 763, 701, 730, 758, 759

[56] References Cited

U.S. PATENT DOCUMENTS

| 3,339,431 | 9/1967 | Croswhite et al. | 74/688 |
| 3,482,469 | 12/1969 | Mori | 74/763 |
| 3,491,621 | 1/1970 | Moan | 74/695 |
| 4,007,648 | 2/1977 | Bookout | 74/763 |
| 4,014,223 | 3/1977 | Pierce, Jr. | 74/688 |
| 4,056,988 | 11/1977 | Kubo et al. | 74/695 |
| 4,143,561 | 3/1979 | Melhorn | 74/730 |

*Primary Examiner*—Kenneth Dorner
*Attorney, Agent, or Firm*—Donald J. Harrington; Keith L. Zerschling

[57] ABSTRACT

An automatic transaxle for use in an automotive vehicle driveline for delivering torque from an engine to the vehicle traction wheels comprising two simple planetary gearsets adapted to provide four forward driving ratios and a single reverse ratio and including three friction clutches, three friction brakes and one overrunning clutch that are strategically arranged to provide optimum spacing between the ratios and smooth ratio changes with minimum shift timing problems for the ratio changes.

3 Claims, 5 Drawing Figures

| Gear | C1 | C2 | C3 | B1 | B2 | B3 | O.W.C. | Gear Ratio | |
|---|---|---|---|---|---|---|---|---|---|
| 1st M/D | X | | X | | X | | X | $\left(\frac{S1+R1}{S1}\right)\left(\frac{R2+S2}{R2}\right) - \frac{R1}{S1}$ | 2.75 |
| 2nd | X | X | | | X | | | $\left(1 + \frac{S2}{R2}\right)$ | 1.50 |
| 3rd | X | X | X | | | | | 1.00 | 1.00 |
| 4th | | X | X | X | | | | $\left(\frac{R1}{R1+S1}\right)$ | .714 |
| Rev. | X | | | | X | | | $-\left(\frac{R1}{S1}\right)$ | -2.50 |

FOUR SPEED RATIO TRANSVERSE AUTOMATIC TRANSMISSION

GENERAL DESCRIPTION OF THE INVENTION

My invention comprises improvements in the automatic transmission shown in U.S. Pat. Nos. 3,491,621 and 4,014,223, which are assigned to the assignee of the invention. It is an improvement also in the transmission disclosed in copending application of George E. Lemieux et al, entitled "Transaxle for a Vehicle Driveline", filed Mar. 26, 1980, Ser. No. 134,240.

My invention is a two-axis transaxle tht is distinguished from the aforementioned patent disclosures by the provision of a hydrokinetic unit mounted on an axis that is parallel to and axially spaced from the axis of the multiple ratio gearing and wherein the gearing comprises two simple planetary gearsets that provide four forward driving speed ratios, the highest speed ratio being an overdrive. The clutches and brakes in my transaxle design are arranged so that the shift from the lowest ratio to the second ratio is a nonsynchronous pickup shift from an overrunning coupling to a clutch, whereas the ratio shift from the second ratio to the third ratio involves disengagement of a brake band and application of a clutch. The ratio shift from the third ratio to the overdrive ratio also involves disengagement of a brake band and engagement of a clutch. No ratio change requires the disengagement of a clutch and a synchronous application of a clutch. Because of this feature, timing problems in the engagement and release of the clutch and brake control servos are eliminated.

My improved transmission system is capable of being used in a wide variety of driveline installations for automotive vehicles. In a preferred arrangement such as that disclosed in this application, the hydrokinetic unit is mounted in concentric disposition with respect to an internal combustion engine, the latter being located transversely with respect to the vehicle centerline.

The multiple ratio gearing in the preferred embodiment herein disclosed is located in transversely spaced relationship with respect to the engine centerline and the hydrokinetic unit is located coaxially with respect to the crankshaft of the internal combustion engine. The torque input elements of the multiple ratio gearing are drivably connected to the output element of the hydrokinetic unit through a drive chain. The final speed reduction gear unit is used on the output side of the multiple ratio gearing to provide the desired overall speed reduction before the torque is delivered to a geared differential mechanism for the paired axle shafts for the vehicle traction wheels. In a typical installation in an automotive vehicle the engine would be located in a forward engine and transmission compartment and the vehicle traction wheels would be the forward wheels rather than the rear wheels, thereby eliminating the usual torque transfer driveshaft and rear axle and differential mechanism commonly associated with rear wheel drive vehicles.

BRIEF DESCRIPTION OF THE FIGURES OF THE DRAWINGS

FIGS. 3A, 3B and 3C show a cross-sectional view of a preferred embodiment of my invention as illustrated schematically in FIG. 1.

PARTICULAR DESCRIPTION OF THE INVENTION

Figures 1, 2:
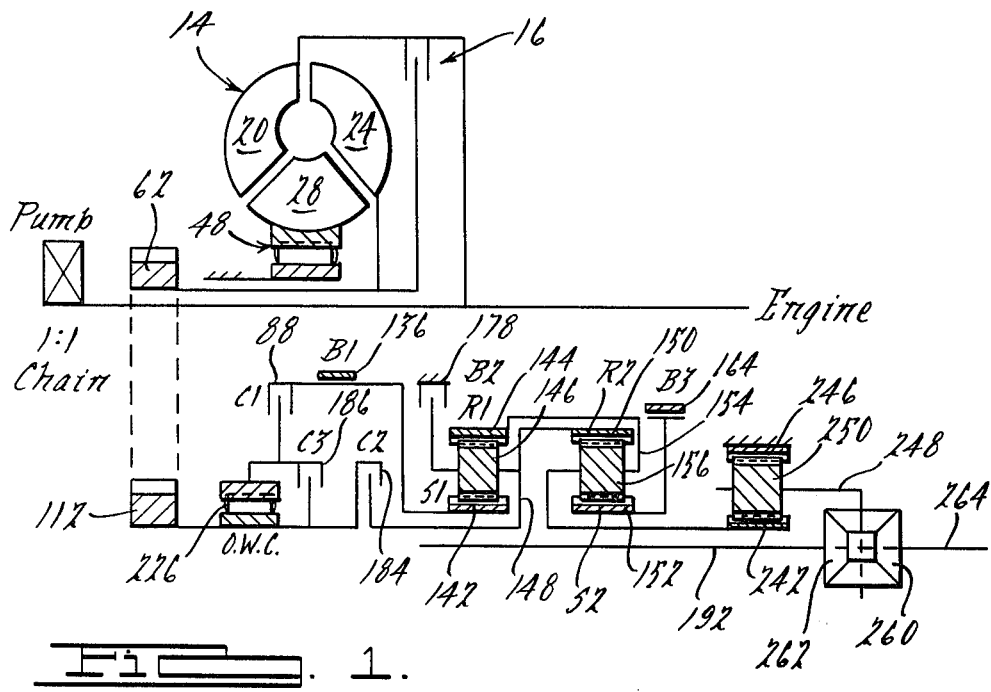
FIG. 1 shows in schematic form the torque delivery elements of the transaxle of my invention.
FIG. 2 is a chart showing the clutch-and-brake engagement and release pattern for controlling the gear elements of FIG. 1. Thus establishing the various ratio changes.
Figure 2A:
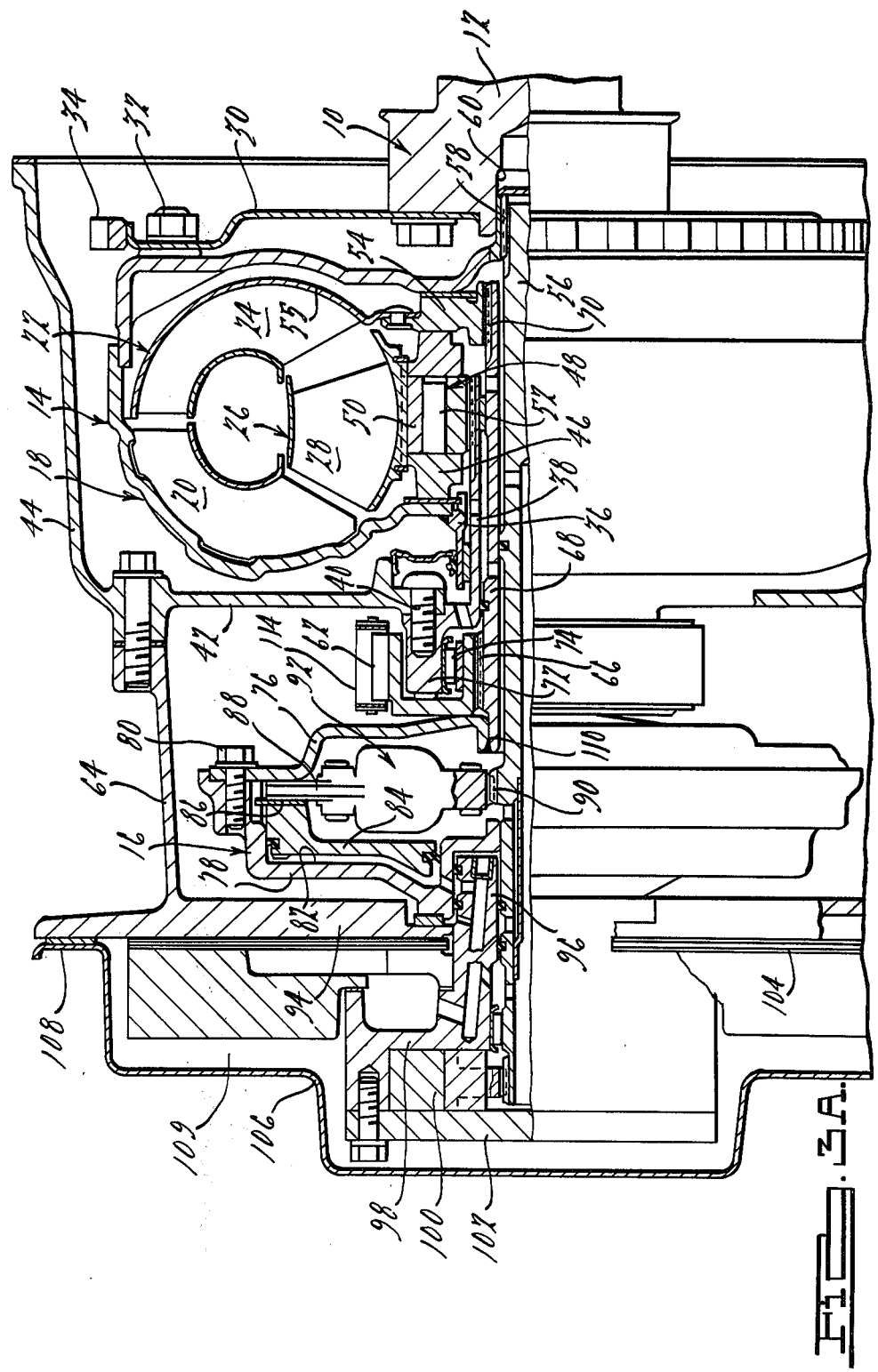

In FIG. 3A reference numeral 10 designates generally one end of a crankshaft for an internal combustion engine, not shown. The axis of the crankshaft is shown at 12 and this axis is common to the axis of a hydrokinetic torque converter 14 and a lockup clutch 16. The function of the clutch 16 will be described subsequently.

Torque converter 14 comprises an impeller housing 18 having radial out-flow impeller blades 20, a bladed turbine 22 having radial in-flow turbine blades 24, and a bladed stator 26 having blades 28 located between the flow exit section of the turbine blades 24 and the flow entrance section of the impeller blades 20. The impeller housing 18 is connected drivably to the crankshaft 10 by means of a driveplate 30, drive bolts 32 being provided for this purpose. Driveplate 30 carries a ring gear 34 which is adapted to engage an engine starter pinion.

Impeller housing 18 has a hub 36 journalled on a stationary support sleeve 38, which is bolted by bolts 40 to the radially inward margin of transverse wall 42 that forms a part of transmission housing 44. Housing 44 is adapted to be bolted to one side of the engine block for the internal combustion engine, not shown.

Stator 26 includes a hub 46 within which an overrunning brake 48 is situated. The brake 48 comprises an inner race splined to the support shaft 38, a cammed outer race 50 and overrunning brake rollers 52 situated between the races whereby the stator 26 is allowed to freewheel in the direction of rotation of the impeller. Rotation in the opposite direction is prevented.

Turbine 22 comprises a turbine hub 54 which is connected drivably to turbine shroud 55. A central torque delivery shaft 56 extends through the converter 14. Shaft 56 is splined at 58 to the hub of the impeller housing 14 and is piloted in an opening 60 in the end of the crankshaft 10.

The lockup clutch 16 and drive pulley 62 are located in a housing 64 which is bolted to the left hand side of the housing 44, as viewed in FIG. 3A. Drive pulley 62 is drivably connected by splines 66 to turbine shaft 68 that extends through the sleeve 38. Turbine shaft 68 is splined at 70 to the turbine hub 34. The sleeve 38 includes an annular bearing portion 72, which provides a bearing support for the pulley 62, the latter being journalled on the support 72 by needle bearing assembly 74.

Clutch 16 comprises a driveplate 76 and a cylinder housing 78 which are joined together at their peripheries, such as by bolts 80. The housing 78 defines an annular cylinder 82 within which is positioned an annular piston 84. Piston 84 is adapted to engage friction discs 86 which are splined externally to the periphery of the housing 78, the driveplate 76 acting as a reaction plate for the clutch force applied by the piston 84.

A friction disc, 88 which forms a part of the clutch assembly, is splined at its hub to the shaft 56 as shown at 90. The clutch assembly includes a damper, generally indicated by reference character 92, to provide a cushioned torque transmitting connection between the shaft 56 and the turbine shaft 68. This damper may comprise springs and friction elements such as those described in U.S. Pat. Nos. 4,014,223 and 4,143,561.

The housing 64 has an end wall 94 which is provided with an opening that receives clutch support sleeve 96. Sleeve 96 forms a part of pump housing 98 which is formed with a pump opening for positive displacement pump elements 100. Pump closure plate 102 closes the left hand side of the pump opening in the housing 98.

A control valve body 104 is secured to the end wall 94 of the housing 64 and is covered by a cover 106 which is bolted at its margin 108 to the housing 64 and which defines an oil sump 109. Valve body 104 contains valve elements that control the ratio changes in the gearing that will be described subsequently.

Figure 3B:
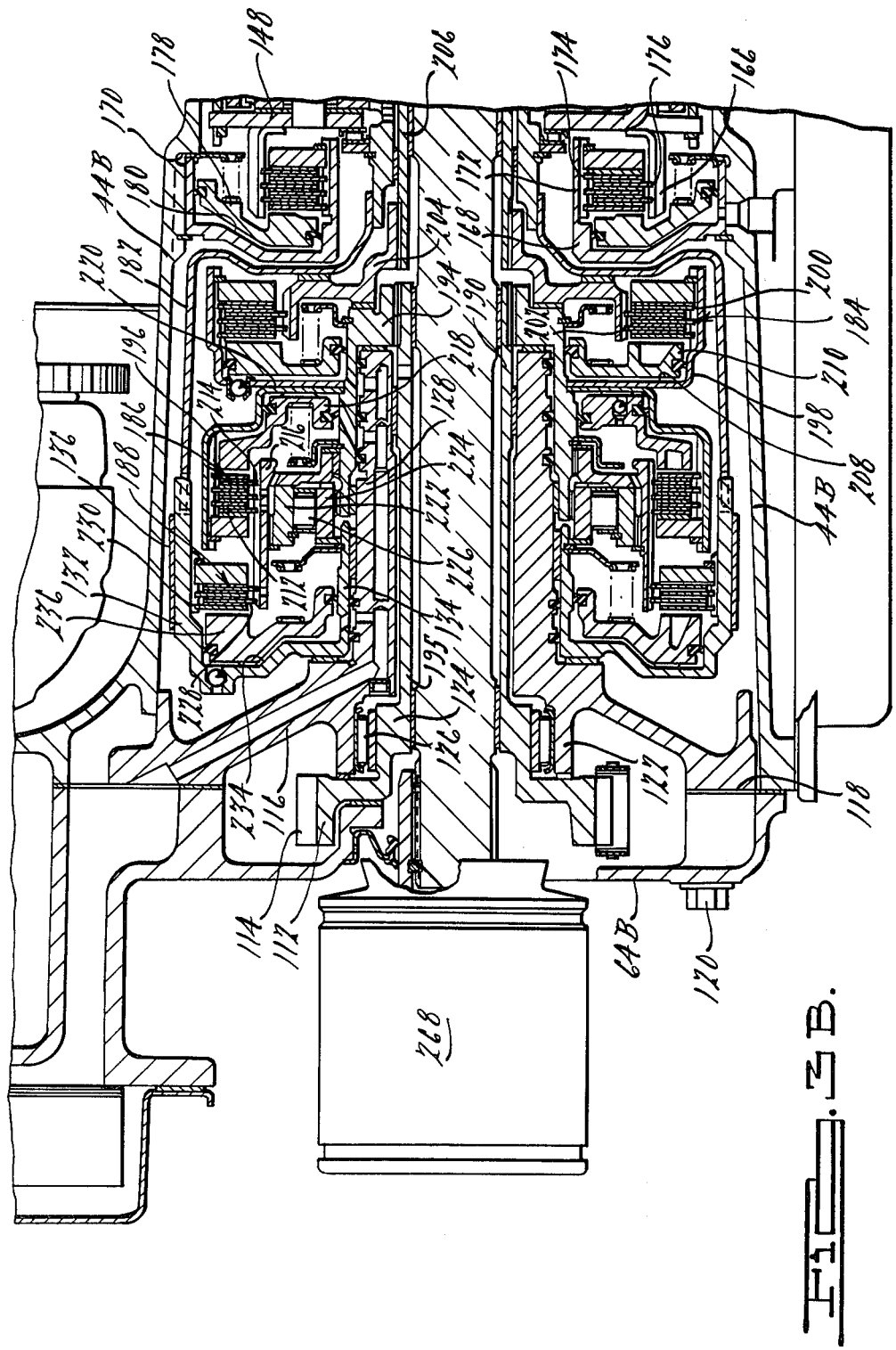
Figure 3C:
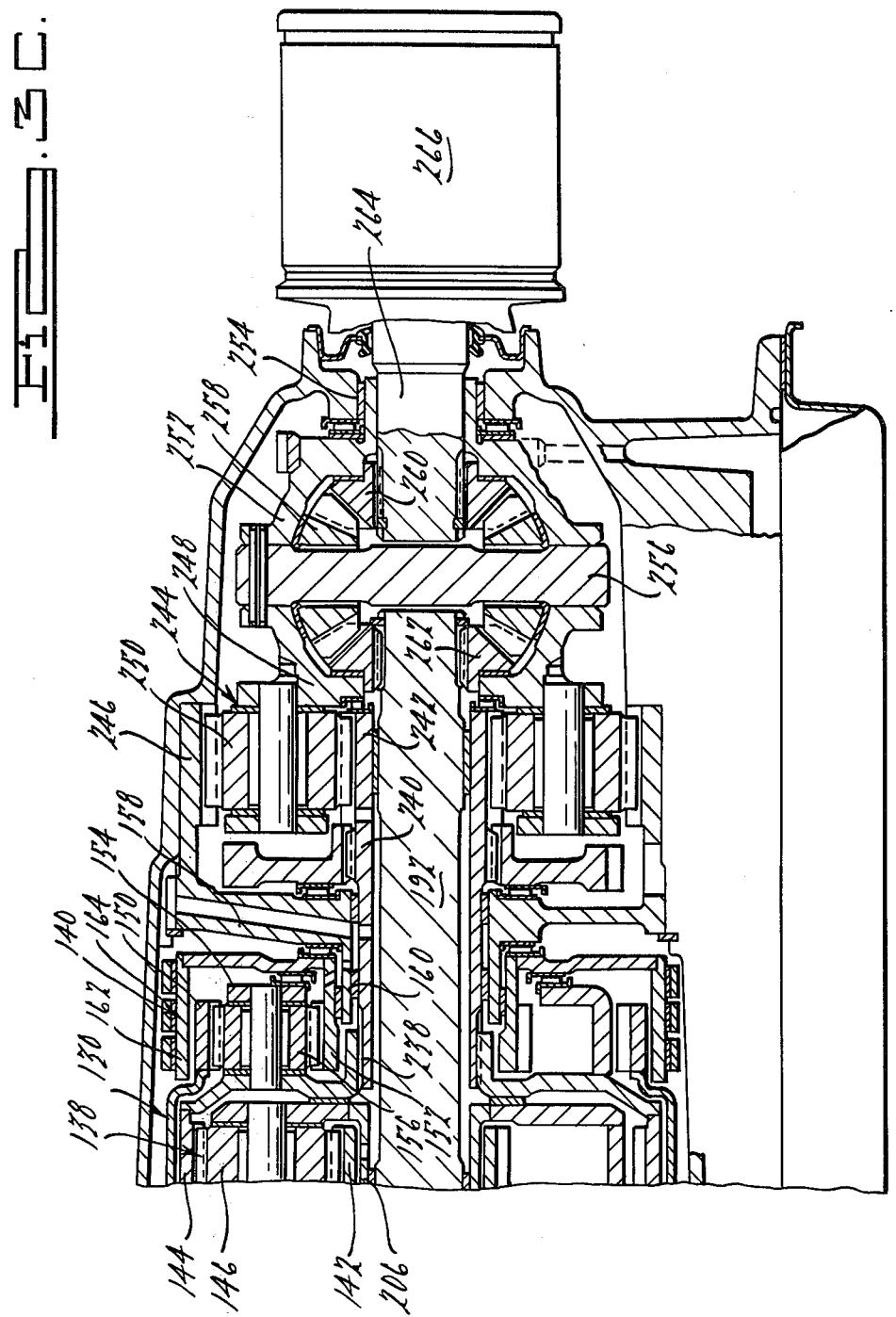

The clutch plate 76 is welded or otherwise secured, as shown at 110, to the turbine shaft 68. Thus, when the lockup clutch 16 is applied, the crankshaft 10 is connected directly to the drive pulley 62 and the hydrokinetic unit is bypassed. The pulley 62 is connected drivably to drive sprocket 112 shown in FIG. 3B, the driving connection being established by drive chain 114. The housing 64 extends, as shown in FIG. 3B, to enclose drive sprocket 112 as shown at 64B. The housing portion 64B is located on one side of the main transmission housing portion 44B which forms a part of the housing 44 illustrated in FIG. 3A.

An internal support wall 116 is bolted to the inner surface 118 of the housing portion 64B by bolts 120. Wall 116 is provided with a circular shoulder 122 within which the hub 124 of the sprocket 112 is located. Sprocket 112 is journalled in the bearing opening in wall 116 by needle bearings 126. The wall 116 has an integral sleeve extension 128 which provides a bearing support for the clutches and brakes that control speed ratio changes for the gearing system illustrated generally at 130. The clutches and brakes comprise a clutch and brake drum 132 which has a hub 134 journalled on the sleeve 128. A brake band 136 surrounds the drum 132 and is adapted to be applied and released by a fluid pressure operated brake servo, not shown. Brake band 136 is applied during operation in the fourth overdrive ratio.

The gear system 130 includes a first simple planetary gear unit 138 and a second simple planetary gear unit 140. Gear unit 138 includes a sun gear 142, a ring gear 144, planet pinions 146 and a carrier 148 on which the pinions 146 are journalled. Gear unit 140 comprises a ring gear 150, a sun gear 152, a carrier 154 and planet pinions 156 that are journalled on carrier 154. Ring gear 144 of gear 138 is connected directly to carrier 154 for gear unit 140. A support wall 158 is located within the housing portion 44B and is provided with a sleeve extension 160 to rotatably journal sun gear 152. A brake drum 162 is supported also on the sleeve extension 160 and is connected directly to the sun gear 152. Brake band 164 surrounds the brake drum 162 and is applied to anchor the sun gear 152 when the transmission is in condition for operation in the lowest speed ratio and the second speed ratio.

The carrier 148 is adapted to be braked against the housing portion 44B during operation in reverse drive. The carrier 148 includes a carrier extension 166 and an annular brake cylinder 168, the latter being fixed against a shoulder 170 formed in the housing portion 44B. The hub 172 of the brake drum 168 carries internally splined brake discs 174. The extension 166 carries externally splined brake discs 176 that register with the brake discs 174. The brake discs 174 and 176 frictionally engage each other to anchor the carrier when annular piston 178 is stroked. The piston is received within an annular cylinder 180 formed by the brake drum 168.

Sun gear 142 is connected directly to the brake drum 132 by a drive shell 182 which encircles clutch 184 engaged during operation in the second, third and fourth forward driving ratios and clutch 186 which is engaged during operation in the third and fourth forward drive ratios. Clutch 188 is located within the brake drum 132.

A sleeve shaft 190 thus surrounds output shaft 192. it is splined to clutch element 194 which carries clutch drums 196 and 198, each drum being welded or otherwise secured to the element 194. Clutch element 194 is splined to sleeve shaft 195. Clutch drum 198 carries externally splined clutch discs 200 which register with internally splined clutch discs 202 carried by clutch element 204, the latter being connected to sleeve shaft 206. Carrier 148 is connected directly to the sleeve shaft 206.

Clutch drum 198 defines an annular cylinder 208 in which is positioned an annular piston 210 which applies a clutch engaging force to the discs 200 and 202 when pressure is admitted to the cylinder 208.

Clutch drum 196 carries externally splined clutch discs 212 which register with internally splined clutch discs carried by clutch element 216. An annular piston 218 is slidably situated in annular clutch cylinder 220 formed by the clutch drum 196. Piston 218 frictionally engages clutch discs 212 and 214 when fluid pressure is admitted to the cylinder 220, thereby establishing a driving connection between overrunning coupling race 222 and sleeve 190. The overrunning coupling race 222 is a part of a coupling assembly that includes also inner race 224 and overrunning clutch rollers 226, the latter being adapted to register with cam surfaces on the race 222. Race 224 is connected directly to the clutch element 194 through a spline connection.

Clutch element 216 carries also internally splined clutch discs 228 and externally splined clutch discs 230 carried by the clutch and brake drum 132. Drum 132 defines an annular cylinder 234 in which is positioned annular piston 236, the latter frictionally engaging the discs 228 and 230 when fluid pressure is admitted to the cylinder 234. Clutch 188 is engaged during operation in the first three underdrive ratios and also in reverse drive.

Carrier 154 is splined at 238 to torque output sleeve shaft 240 which is connected directly to sun gear 242 of forward drive gear unit 244. The gear unit includes also a ring gear 246 that is held stationary and which forms part of the wall 158. Gear unit 244 includes also a carrier 248 on which is journalled a set of pinions 250. Carrier 248 is connected drivably to differential carrier 252 which is supported as shown at 254 on one end of the housing portion 44B. Differential pinion shaft 256 journals differential pinions 258, the shaft 256 being received in shaft openings formed in the differential carrier 252. Pinions 258 engage side gears 260 and 262, side gear 260 being splined to one output drive shaft 264 and side gear 262 being splined to the other output drive shaft 192. The outboard ends of the shafts 264 and 192 are adapted to be connected to vehicle drive half shafts by means of constant velocity universal joints illustrated schematically at 266 and 268, respectively.

In the schematic representation of the transmission shown in FIG. 1, the clutches and brakes are indicated by the symbols $C_1$, $C_2$, $C_3$, $B_1$, $B_1$, $B_2$, $B_3$ and OWC. These symbols are used also in the chart of FIG. 2 which shows the clutch and brake engagement and release pattern. Low speed operation is achieved by engaging clutch $C_1$ and brake $B_3$ simultaneously. Torque normally would be delivered under these conditions from the driven sprocket 112 through the overrunning clutch OWC and through clutch $C_1$ to the sun gear 142. If coasting is desired in the low speed ratio, clutch $C_3$ can be engaged to permit a reverse transfer of torque.

A ratio change from the low speed ratio to the second speed ratio is achieved merely by engaging the single clutch $C_2$. This causes driving torque to be delivered from the sprocket 112 directly to the ring gear $R_2$ of the gear unit 150. This shift is a nonsynchronous shift that does not require disengagement of a clutch in timed relationship with respect to the engagement with another clutch. The provision of the overrunning coupling 226 eliminates timing problems normally associated with a clutch-to-clutch shift.

A ratio change to the third speed ratio is achieved merely by engaging clutch $C_3$ while clutch $C_2$ remains applied. Clutch $C_1$ also remains applied. Torque now is delivered directly to the sun gear $S_1$ from the sprocket 112 as well as directly from the sprocket 112 to the ring gear $R_2$. The gear system 130 thus operates with a 1:1 ratio.

Overdrive is achieved by disengaging clutch $C_1$ and applying brake $B_1$ while brake $B_3$ remains applied. Such a clutch-to-brake shift does not present timing problems and a simplified control system for regulating the shift point is feasible.

Reverse drive is obtained by engaging simultaneously clutch $C_1$ and brake $B_2$. Torque from the sprocket 112 then is delivered through the overrunning coupling and through the clutch $C_1$ and to the sun gear 142 since brake $B_2$ anchors the carrier 148 ring gear 144 and the output member of the gear system rotate in a reverse direction.

The drive chain that connects the sprocket 62 and sprocket 112 provides a 1:1 driving ratio. Similar drive chains may be seen in reference U.S. Pat. Nos. 3,491,621 and 3,158,040.

A lockup clutch 16 can be engaged to provide a fully mechanical driving connection between the engine and the output shafts. In the particular embodiment disclosed here, the clutch 16 is located on the outboard side of the assembly although it might be possible to use instead of the clutch 16 a lockup clutch located within the converter impeller housing as shown in U.S. Pat. No. 4,143,561.

Having described a preferred form of my invention what I claim and desire to secure by U.S. Letters Patent is:

1. In a power transmission mechanism for an automotive vehicle having an engine and traction wheels, a hydrokinetic unit having an impeller and a turbine mounted on a first axis, said impeller being connected to said engine;

planetary gearing mounted on a second axis that is spaced laterally from said first axis, a torque input shaft for said gearing;

torque transfer means drivably connecting said turbine and said input shaft;

said gearing comprising a pair of simple planetary gear units, each gear unit having a sun gear, a ring gear, a carrier and planet pinions on said carrier engaging said sun and ring gears, a first friction clutch means and an overrunning coupling in series relationship adapted to connect said input shaft to the sun gear of a first of said gear units, a torque output shaft connected to the carrier of the second of said gear units, a pair of drive shafts for the traction wheels, one drive shaft extending through said gearing and the other extending in the opposite direction, final drive gearing including a differential gear assembly having a torque input element and connecting said torque output shaft with said drive shafts, the ring gear of said first gear unit being connected to the carrier of said second gear unit;

first brake means for braking the sun gear of said first gear unit during overdrive operation;

second brake means for braking the carrier of said first gear unit during reverse drive, the ring gear of said second gear unit being connected to the carrier of said first gear unit;

third brake means for braking the sun gear of said second gear unit during first and second underdrive operation;

second friction clutch means for connecting said input shaft to the carrier of said first gear unit during third direct drive operation and during overdrive operation;

and third friction clutch means in parallel with said overrunning coupling;

said torque transfer means comprising a first sprocket connected to the turbine of said hydrokinetic unit, a second sprocket connected to said input shaft and a drive chain drivably connecting said sprockets, said differential gear assembly, said gear units and said second sprocket being mounted about said second axis, said axes being parallel to each other and being adapted to be mounted transversely with respect to the fore-and-aft centerplane of the vehicle.

2. The combination as set forth in claim 1 wherein said final drive gearing includes a sun gear connected to the carrier of said second gear unit, a carrier connected to the torque input element of said differential gear assembly, a ring gear fixed to a stationary housing portion of said mechanism, and planet pinions on the carrier of said final drive gearing engaging the sun and ring gears thereof.

3. The combination as set forth in claim 2 wherein said mechanism includes lockup clutch means adjacent said first sprocket and mounted on said first axis for directly coupling together said turbine and said impeller.

* * * * *